US007596780B2

(12) United States Patent
Selitrennikoff et al.

(10) Patent No.: US 7,596,780 B2
(45) Date of Patent: Sep. 29, 2009

(54) SYSTEM AND METHOD FOR VIRTUAL CATCHING OF AN EXCEPTION

(75) Inventors: Sean Selitrennikoff, Sammamish, WA (US); Michael M. Magruder, Sammamish, WA (US); Jonathan W. Keljo, Bellevue, WA (US); Ian H. Carmichael, Sammamish, WA (US); Brian D. Harry, Chapel Hill, NC (US)

(73) Assignee: Microsoft Corporation, Redmond, WA (US)

( * ) Notice: Subject to any disclaimer, the term of this patent is extended or adjusted under 35 U.S.C. 154(b) by 562 days.

(21) Appl. No.: 10/971,542

(22) Filed: Oct. 22, 2004

(65) Prior Publication Data
US 2006/0101411 A1    May 11, 2006

(51) Int. Cl.
*G06F 9/44* (2006.01)
(52) U.S. Cl. .................................. 717/130; 717/124
(58) Field of Classification Search .................. None
See application file for complete search history.

(56) References Cited

U.S. PATENT DOCUMENTS 6,009,517 A * 12/1999 Bak et al. .................. 712/245
6,493,834 B1 * 12/2002 Bates et al. ................. 714/38
2003/0018961 A1 * 1/2003 Ogasawara ................. 717/158
2004/0128658 A1 * 7/2004 Lueh et al. ................. 717/151
2004/0268310 A1 * 12/2004 Morgan ...................... 717/124

OTHER PUBLICATIONS

Garcia et al. A Comparative Study of Exception-Handling Mechanisms for Building Dependable Object-oriented Software, Journal of Systems and Software, vol. 59, Issue 2, Nov. 2001, pp. 197-222.*
Sinha et al, Control-Flow Analysis of Programs with Exception Handling Constructs, Technical Report OSU-CISRC-7/98-TR25, Jul. 1998, pp. 1-32. [retrieved on Jun. 22, 2009] Retrieved from the Internet: URL <http://kaul.inf.fh-bonn-rhein-sieg.de/home/script/se2/material/testen/control_flow_exceptions.pdf.*

* cited by examiner

*Primary Examiner*—Tuan Q Dam
*Assistant Examiner*—Cheneca P Smith
(74) *Attorney, Agent, or Firm*—Lee & Hayes, PLLC (57) ABSTRACT

The techniques and mechanisms described herein are directed to a method for virtually catching an exception. A debugger receives a notification identifying information about an exception that occurred during execution of an application. The debugger then selectively chooses a location on a call stack where execution of the application resumes after the stack is unwound up to the selected location. The location being between a statement on the stack causing the exception and a handler on the stack. The handler being identified during a search phase for exception processing. The mechanism being operative for both handled exceptions and unhandled exceptions.

29 Claims, 6 Drawing Sheets

SYSTEM AND METHOD FOR VIRTUAL CATCHING OF AN EXCEPTION

TECHNICAL FIELD

This document generally relates to software development tools and services, and more particularly, to debugging services that support software development tools.

BACKGROUND

During software development, software code is tested and debugged using software development tools generally referred to as debuggers. Debuggers allow software developers to set break points within their software code, step through each instruction within the software code, and the like. By using the debugger, the software developer can see errors within their software code, such as null pointers, incorrect setting of local variables, and the like.

In addition, debuggers can view and track exceptions that occur when executing the software code. When an exception occurs, the debugger may notify a user (i.e., programmer) that an exception occurred and allow the user to choose a course of action, such as terminating execution or attempting to restart execution at the instruction that failed.

In overview, an exception is a bundle of information that is propagated through the program using a means of flow control referred to as "exception handling." The initiation of exception handling for a given exception is referred to as "throwing" the exception. An exception may be thrown due to hardware errors, software errors, or to take advantage of the exception handling as a control flow mechanism. Hardware exceptions are typically unexpected and include access violations, floating point errors, and the like. Software exceptions are explicitly thrown by an application and may occur for a variety of reasons, such as an invalid argument and the like. A typical debugger may notify a user of an exception when if first occurs, before the application is given any opportunity to handle the exception, or when an exception has gone unhandled (i.e., an unhandled exception).

An unhandled exception refers to an exception that does not have an exception handler specified for handling the exception. Exception handlers are defined using exception handling constructs within the source code associated with the executing software code. In general, exception handling constructs specify an exception handler for a particular lexical scope within the software code. This handler may be executed in response to exceptions occurring while executing the statements within that lexical scope, including any function calls.

Figure 1:
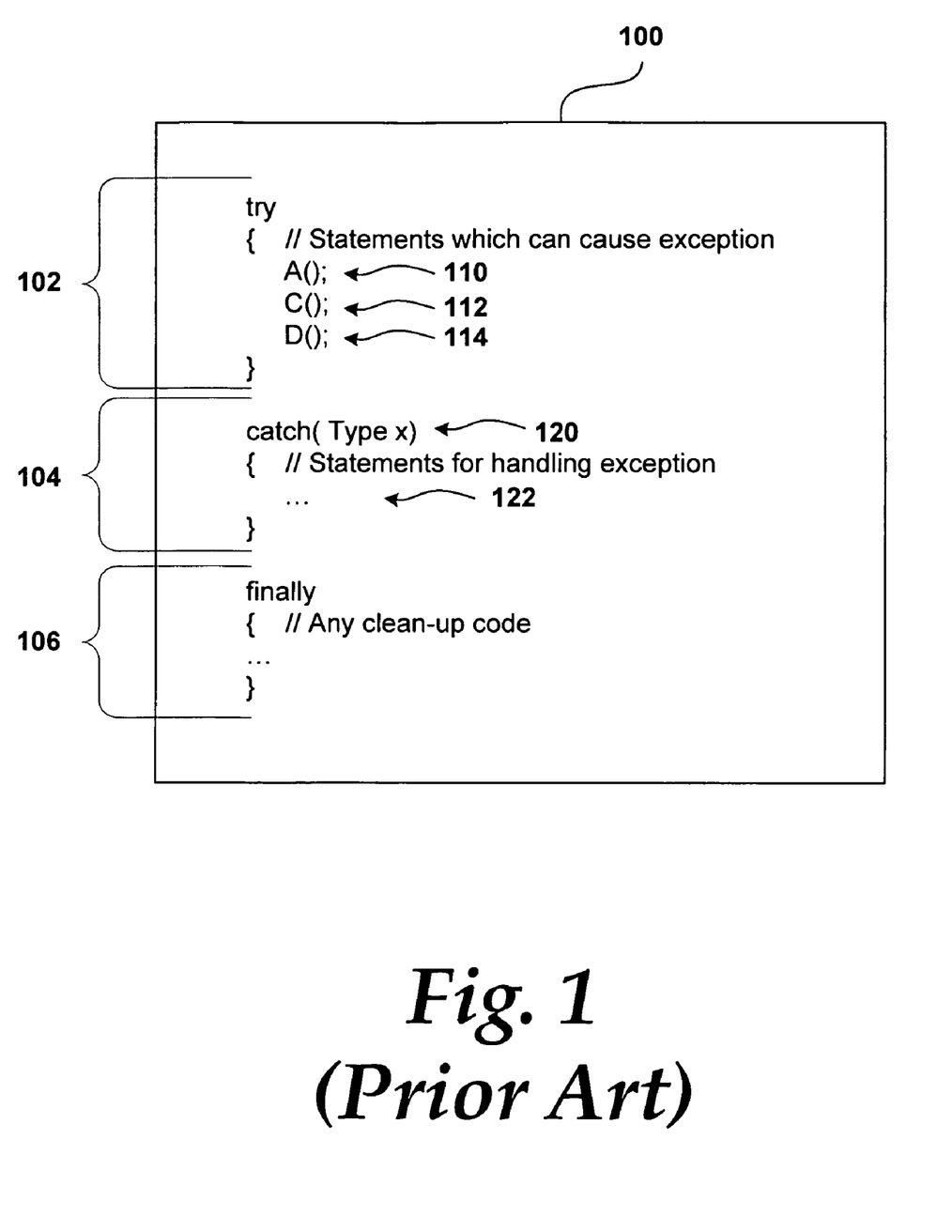
FIG. 1 is a portion of pseudo-code illustrating existing exception constructs within software source code.

Each programming language may use their own exception handling constructs. FIG. 1 illustrates pseudo-code that specifies one existing type of exception handling constructs. The pseudo-code 100 in FIG. 1 is based on the C# programming language. In the C# programming language, there are three exception constructs: a try block 102, a catch block 104, and a finally block 106. For any try block 102, there is either one finally block 106 or at least one catch block 104. In addition, both may be present. The try block 102 encloses the statements that may throw an exception. Continuing with the example above, try block 102 encloses the statements 110-114 that call functions A( ), C( ), and D( ), respectively. A catch clause 120 of optional catch block 104 may specify criteria governing execution of statements 122 in response to an exception. Those criteria may specify: a) handling of a given type of exception and any subtypes, b) handling exceptions based on the result of a developer-provided Boolean expression, c) handling of all exceptions, or d) other conditions. When there are multiple catch blocks 104 associated with try block 102, each catch block 104 identifies different criteria and may have different statements 122. Using the C# exception constructs, it is important to note that the catch block 104 only covers exceptions occurring within the region specified by the try block 102 that meet the criteria specified by its catch clause 120. However, exception constructs in other languages may allow a catch block that catches any type of exception, not just a specific type. The finally block 106 may be used for performing any clean-up processing, such as calling destructors and the like. If a finally block 106 is specified, the statements within the finally block 106 should be executed.

While FIG. 1 illustrates pseudo-code in the C# programming language, adding exception constructs is similarly performed for any programming language, such as C++, managed C++, VISUAL BASIC (VB), and others. Typically, unhandled exceptions result in termination of the executable code. The operating system or runtime environment may provide a default mechanism that provides limited support for processing unhandled exceptions, such as providing a dialog box with information about the exception and an option whether to terminate or debug. Choosing to debug an unhandled exception allows the developer to inspect the state of the process. In some environments, it is possible for the developer to re-execute the faulting machine instruction.

However, until now, there has not been a satisfactory solution for handling a previously unhandled exception and continuing execution from a debugger.

SUMMARY

The techniques and mechanisms described herein are directed at debugging handled and/or unhandled exceptions. The mechanisms allow the debugger to virtually insert an empty catch block during the processing of an exception. The catch block may be virtually inserted at various points within the call stack. For example, the catch block may be virtually inserted between the location originally specified for handling the exception, as specified by the exception constructs in the source code, and the location from which the exception was thrown. Thus, by using the present virtual catching mechanism, a debugger can handle any exception and can specify at which point to re-start execution of the code, even if the exception did not have any exception handler specified for it in the source code.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Briefly, the present mechanisms described herein are directed at debugging exceptions (handled or unhandled). The mechanisms allow the virtual insertion of an empty catch block during processing of an exception. The exception system then executes as if there were an exception handler specified for the exception in the source code. The catch block may be virtually inserted at various points within the software code. For example, the catch block may be virtually inserted between the location originally specified for handling the exception, as specified by the exception constructs in the source code, and the location from which the exception was thrown. By using the present virtual catching mechanism, a debugger can handle a previously unhandled exception. In addition, the debugger can handle any previously handled exception using a virtual handler rather than the handler specified for the exception in the exception constructs in the source code. The virtual handler may be inserted at various points on the call stack between the location at which the exception was thrown and the location of the conventional exception handler as defined by the corresponding exception construct in the source code. In both cases, the debugger can re-start execution at various points on the call stack. These and other advantages will become clear after reading the following detailed description.

Exemplary Computing Environment

Figure 2:
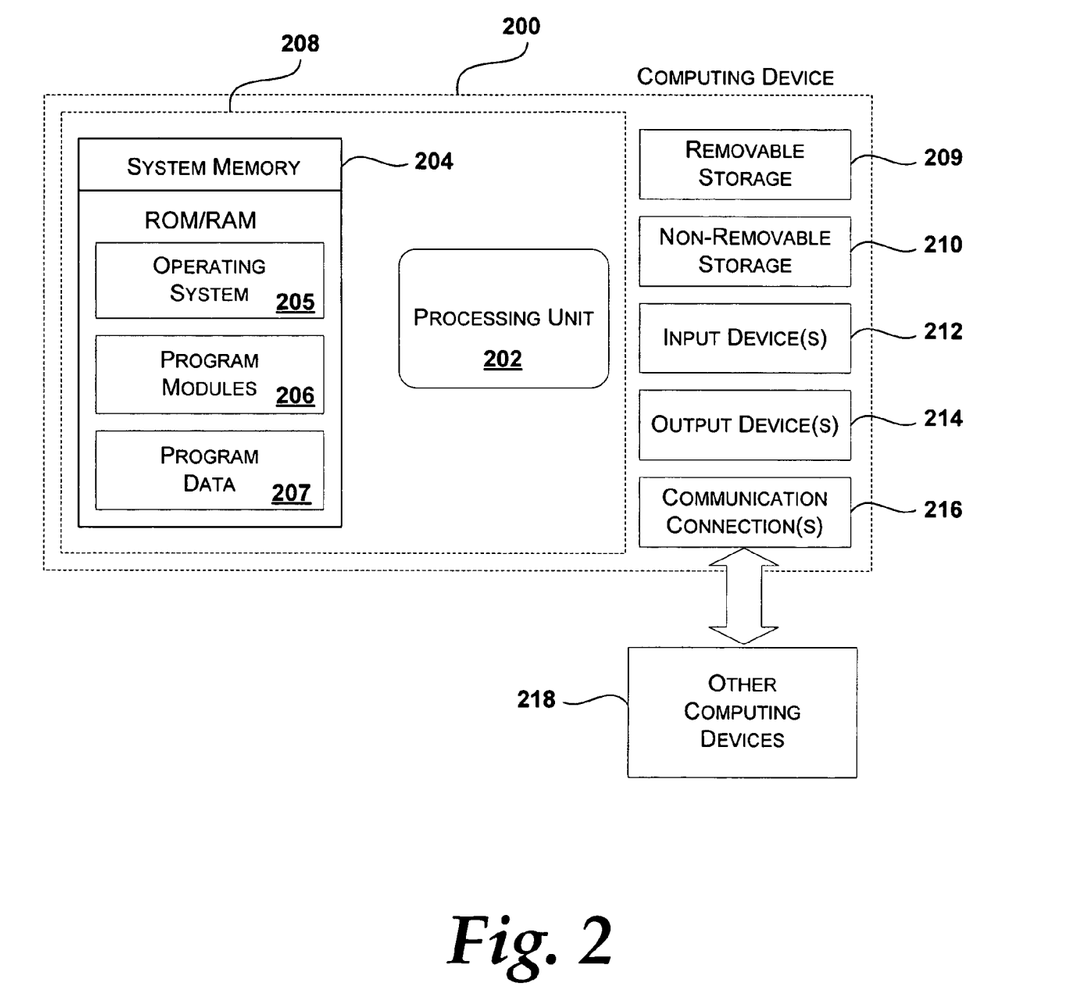
FIG. 2 is an illustrative computer environment that may be used to implement the techniques and mechanisms described herein.

The various embodiments of the present virtual catching mechanism may be implemented in different computer environments. The computer environment shown in FIG. 2 is only one example of a computer environment and is not intended to suggest any limitation as to the scope of use or functionality of the computer and network architectures. Neither should the computer environment be interpreted as having any dependency or requirement relating to any one or combination of components illustrated in the example computer environment.

With reference to FIG. 2, one exemplary system for implementing the present virtual catching mechanism includes a computing device, such as computing device 200. In a very basic configuration, computing device 200 typically includes at least one processing unit 202 and system memory 204. Depending on the exact configuration and type of computing device, system memory 204 may be volatile (such as RAM), non-volatile (such as ROM, flash memory, etc.) or some combination of the two. System memory 204 typically includes an operating system 205, one or more program modules 206, and may include program data 207. This basic configuration is illustrated in FIG. 2 by those components within dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by removable storage 209 and non-removable storage 210. Computer storage media may include volatile and nonvolatile, removable and non-removable media implemented in any method or technology for storage of information, such as computer readable instructions, data structures, program modules, or other data. System memory 204, removable storage 209 and non-removable storage 210 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 200. Any such computer storage media may be part of device 200. Computing device 200 may also have input device(s) 212 such as keyboard, mouse, pen, voice input device, touch input device, etc. Output device(s) 214 such as a display, speakers, printer, etc. may also be included. These devices are well know in the art and need not be discussed at length here.

Computing device 200 may also contain communication connections 216 that allow the device to communicate with other computing devices 218, such as over a network. Communication connection(s) 216 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

Exemplary Operating Environment

Figure 3:
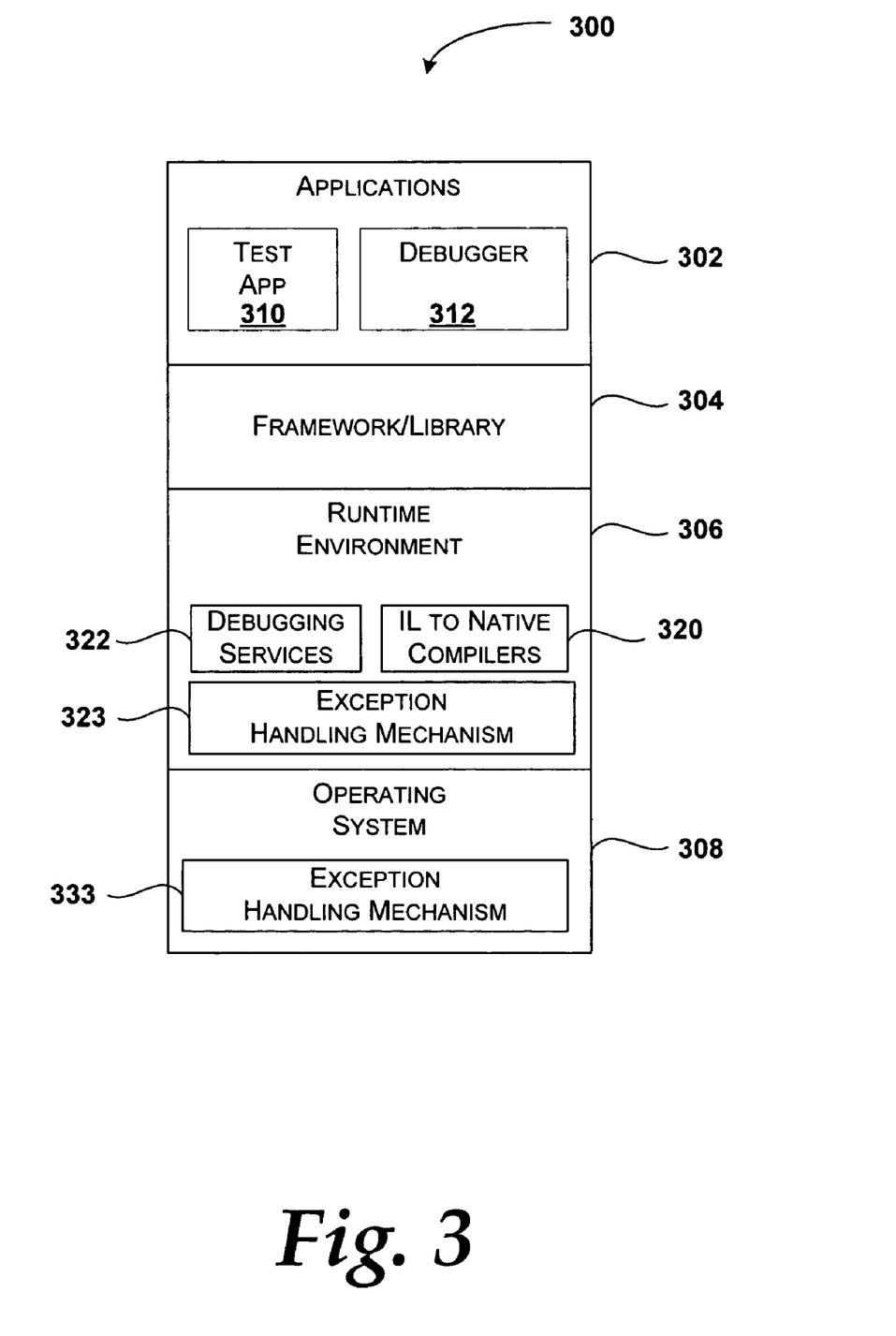
FIG. 3 is an illustrative operating environment suitable for implementing the techniques and mechanisms described herein.

FIG. 3 is an illustrative operating environment 300 suitable for implementing the techniques and mechanisms described herein. The operating environment includes one or more applications 302, a framework/library 304, a runtime environment 306, and an operating system 308. The operating environment 300 may execute on one or more computing devices, such as computing device 200 as shown in FIG. 2. Applications 302 include a test application 310 and a debugger 312. For the present virtual catching mechanism, the test application 310 is typically in software development and undergoing debugging by debugger 312. Before describing the interactions of the other components of the operating environment 300 with the test application 310 and the debugger 312, the test application 310 is further described.

Figure 4:
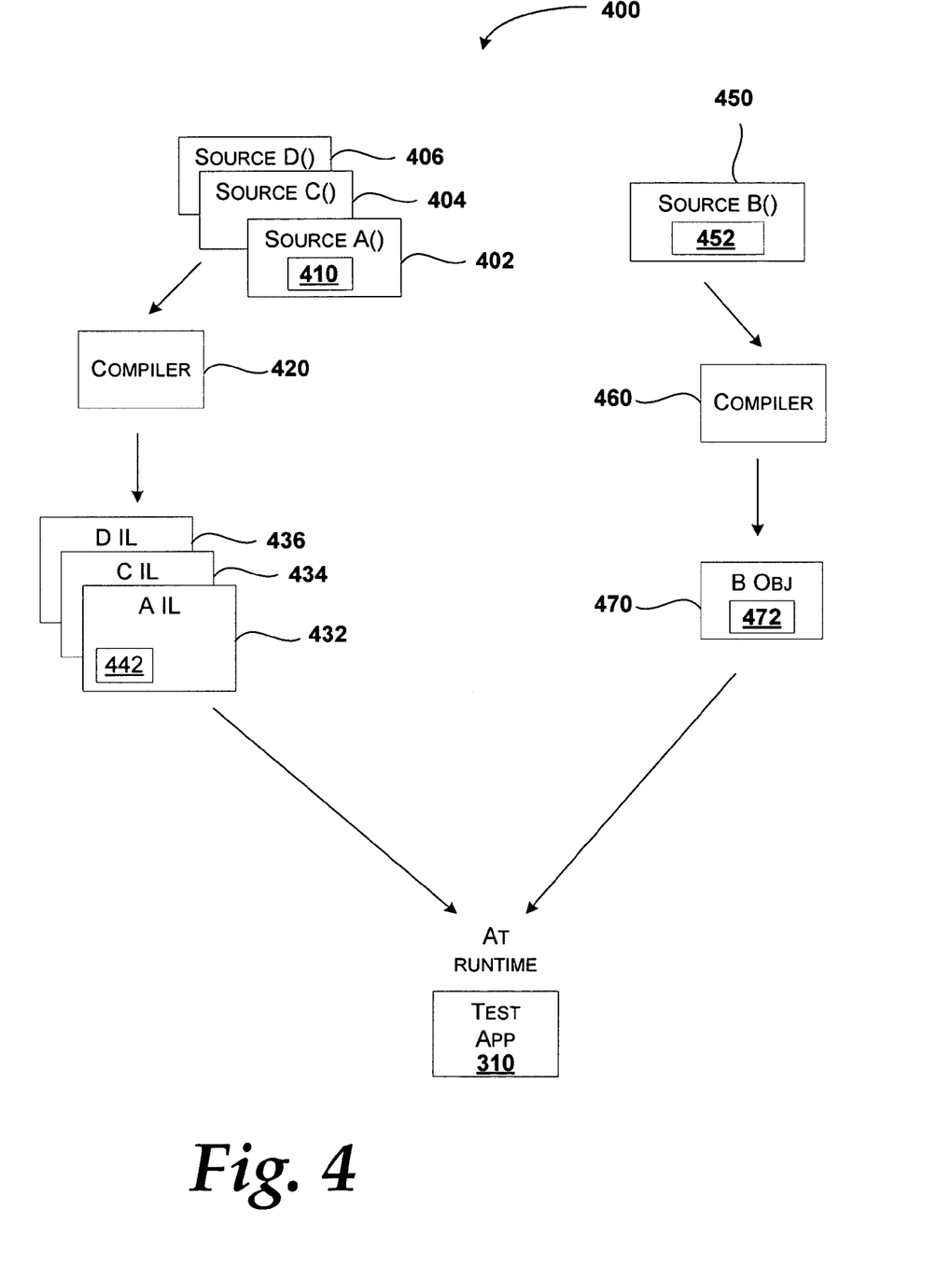
FIG. 4 is a block diagram illustrating the creation of software modules associated with a test application.

FIG. 4 is a block diagram illustrating the creation of software modules associated with test application 310. At runtime, the test application 310 may utilize modules that have been written in a variety of programming languages. Source files 402-406 represent source code written for a "managed" environment, such as the COMMON LANGUAGE RUNTIME (CLR) environment manufactured by the Microsoft Corporation, Redmond, Wash. Thus, source files 402-406 may be written in any intermediate language (IL) supported language, such as C#, VISUAL BASIC (VB), and the like. Source file 450 represents source code written for an "unmanaged" environment, such as traditional environments executing C or C++ code. While only one source file 450 is illustrated and only three managed source files 402-406 are illustrated, one skilled in the art will appreciate that there may be numerous source files. In addition, for convenience and for illustration purposes, each source file contains one function. For example, source file 402 contains function A( ), source file 404 contains function C( ), source file 406 contains function D( ), and source file 450 contains function B( ). However, source files may contain any number of functions without departing from the present virtual catching mechanism.

As described above in FIG. 1, in order for the software to handle specific exceptions, exception constructs, such as exception constructs 410 for source files 402-406 and exception constructs 452 for source file 450, are defined within the source files for the specific exceptions. These exception constructs 410 and 452 are specific to the programming language used for writing the source files.

Source files 402-406 are compiled by an Intermediate Language (IL) compiler 420. The IL compiler 420 outputs corresponding IL modules 432-436 that contain instructions associated with function A, C, and D, respectively. Each IL module 432-436 includes information 442 necessary for associating an exception handler to a particular exception. The information is generated by the IL compiler 420 using conventional techniques.

Likewise, source file 450 is compiled by a compiler 460 into an object file 470. The object file 470 includes exception handlers 472. The object file 470 contains executable instructions compiled from statements within source file 450. At runtime, test application 310 may utilize any of these modules 432-436 and 470 for execution.

Referring back to FIG. 3, during runtime, test application 310 is executed by utilizing framework 304, runtime environment 306, and operating system 308. Framework 308 may be a set of libraries or other services. Runtime environment 306 is responsible for performing many services, such as encryption, security, garbage collection, Just-in-Time (JIT) compilation, pre-JIT compilation, and others. Therefore, the IL modules (e.g., IL modules 432-436 in FIG. 4) may be compiled by any of the IL-to-Native-code compilers 320 to form executable instructions. In addition, the executable instructions within object module 470 may be loaded into memory for execution. One service pertinent to the present virtual catching mechanism is debugging services 322. Briefly, debugging services 322, described below in conjunction with the sequence diagram in FIG. 6, communicates with debugger 312 in a manner that allows the debugger to identify a specific location for virtually inserting an empty catch block.

Briefly, virtually inserting an empty catch block, described below in detail in conjunction with FIGS. 5 and 6, catches an exception at a point on the call stack chosen by the debugger. In order to virtually insert an empty catch block, debug services 322 also communicates with an exception handling mechanism 323 within runtime environment 306, which may or may not communicate with exception handling mechanism 333 within operating system 308.

The exception handling mechanism may be implemented in various ways. For example, one exception handling mechanism that is well suited for implementing with the present virtual catching mechanism is the COMMON LANGUAGE RUNTIME Exception Handling architecture, which is built upon the WIN32 Structured Exception Handling architecture. For additional information on the WIN32 Structured Exception Handling architecture, one is invited to read the article entitled "A Crash Course on the Depths of Win32™ Structured Exception Handling" by Matt Pietrek in the January 1997 edition of *Microsoft Systems Journal*. In overview, the Exception Handling Mechanism supports two phases for exception processing: a search phase and an unwind phase. These two phases are now described in conjunction with an example execution of test application 310.

Figure 5:
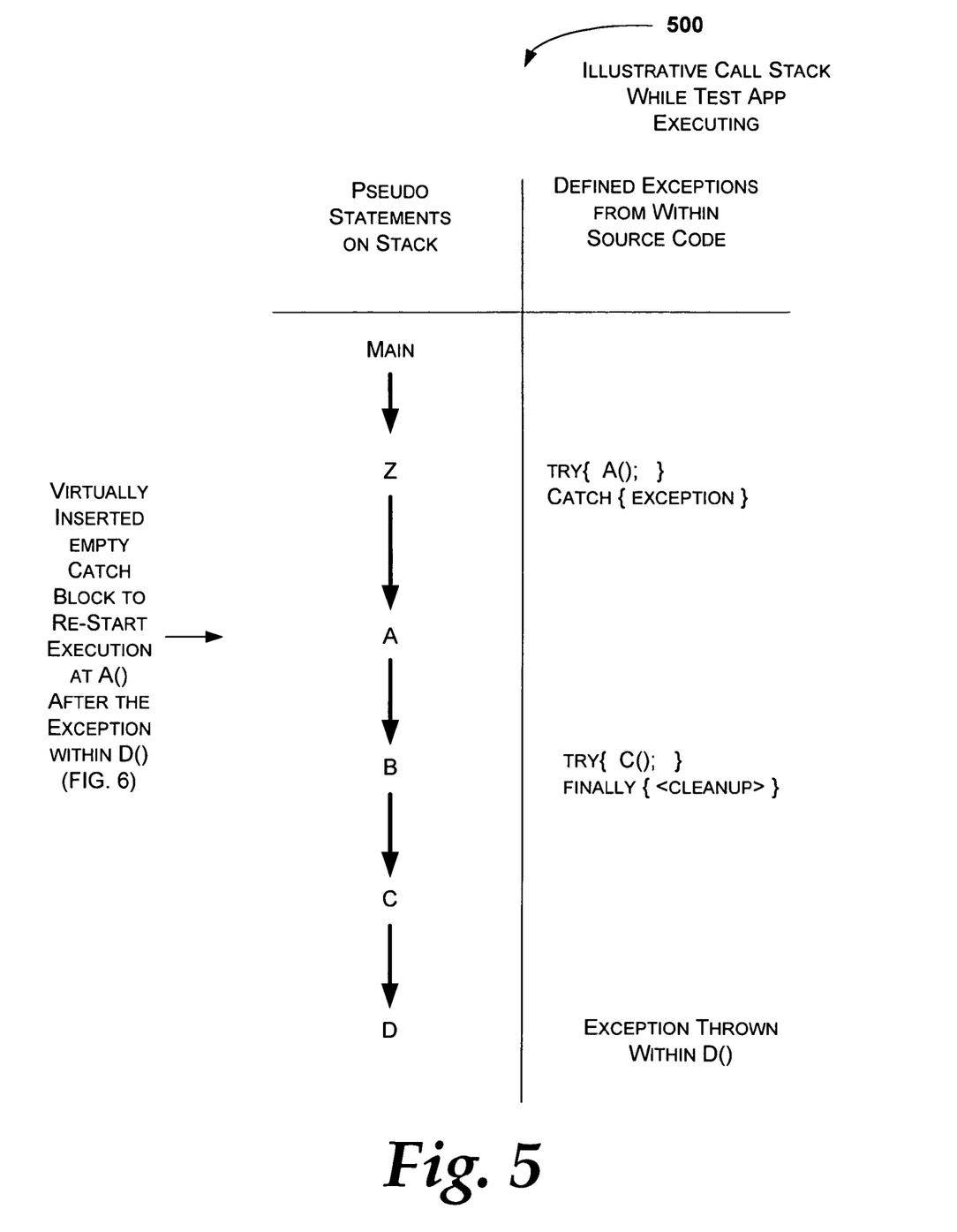
FIG. 5 is an illustrative call stack during processing of an exception in the illustrative test application shown in FIG. 4 in accordance with the present virtual exception mechanisms.

FIG. 5 is an illustrative call stack during processing of an exception in the illustrative test application shown in FIG. 4 in accordance with the present virtual catching mechanisms. FIG. 5 illustrates two columns. The left column indicates function calls placed on the call stack. The right column indicates the exception constructs defined for the associated function within the associated source code.

The call stack will now be briefly explained. Test application 310 includes a call to a main function. The main function calls function Z( ). Function Z( ) calls function A( ). Function A( ) calls function B( ). Function B( ) calls function C( ). Function C( ) calls function D( ). For our example, during execution of function D( ) an exception is thrown. In this example, functions Z( ), A( ), C( ), and D( ) are managed code and function B( ) is unmanaged code. Before describing how the exception is handled, the exception constructs in the right column are described.

Function Z( ) includes a try block that specifies a region including a call to function A( ). Thus, an exception thrown by function A( ) or any function called by function A( ) (directly or via further layers of calling) may be processed using the statements within the catch block associated with function Z( ) if the search for an exception handler reaches function Z( ). Function A( ) does not include any exception constructs. Function B( ) includes a try block that specifies a region including a call to function C( ). In addition, function B( ) includes a finally block that executes code to clean up.

Exception systems may be implemented in many ways. The present virtual catching mechanism interacts with an exception system that operates in two phases: a search phase followed by an unwind phase. In addition, the exception system provides notifications during the search phase. For example, notifications may occur when a handler is found for an exception or when it is known that no handler exists. The exception system may also provide additional notifications which the present virtual catching mechanism may utilize. Finally, the exception system supports ending the search phase at any notification and performing the unwind phase up to a designated point. The processing of the exception during function D( ) by such an exception system is now described.

The exception system implements portions of the conventional two phase exception processing. Because the processing of the search phase and unwind phase for conventional systems are well known in the art, neither are discussed at length here. However, a brief overview is appropriate. In addition, variations to the conventional two phase exception processing are specifically noted. In overview, when an exception occurs during the execution of the function D( ), the exception processing begins the first of its two phases. The first phase is the search phase. During the search phase, the call stack is walked up to identify any exception handler configured to handle exceptions within the region of the function D( ). The search begins with function D( ). Because function D( ) does not have any exception constructs, the search continues at function C( ). Because function C( ) also does not have any exception constructs, the search continues at function B( ). Function B( ) has a try block, that covers the call to function C( ). However, because the try block does not have any catch blocks, the search continues at function A( ). Because function A( ) does not have any exception constructs, the search continues at function Z( ). Function Z( ) has a try block that covers the call to function A( ), and a catch block whose criteria match the exception currently being processed. Thus the search identifies function Z( ) for handling the exception. One would note, that if function Z( ) had not covered the region in which the exception occurred or none of the catch block criteria matched the exception that had occurred, the search phase would have continued up the call stack to identify a handler. However, once the search phase identifies the handler for handling the exception, the next phase (i.e., the unwind phase) of exception processing begins.

The unwind phase walks up the call stack and executes any of the finally blocks associated with try blocks that cover the currently-active call. In convention exception handling techniques, if the search phase finds a catcher for the exception, the unwind executes that catch block. The exception is then considered handled and normal execution resumes.

Figure 6:
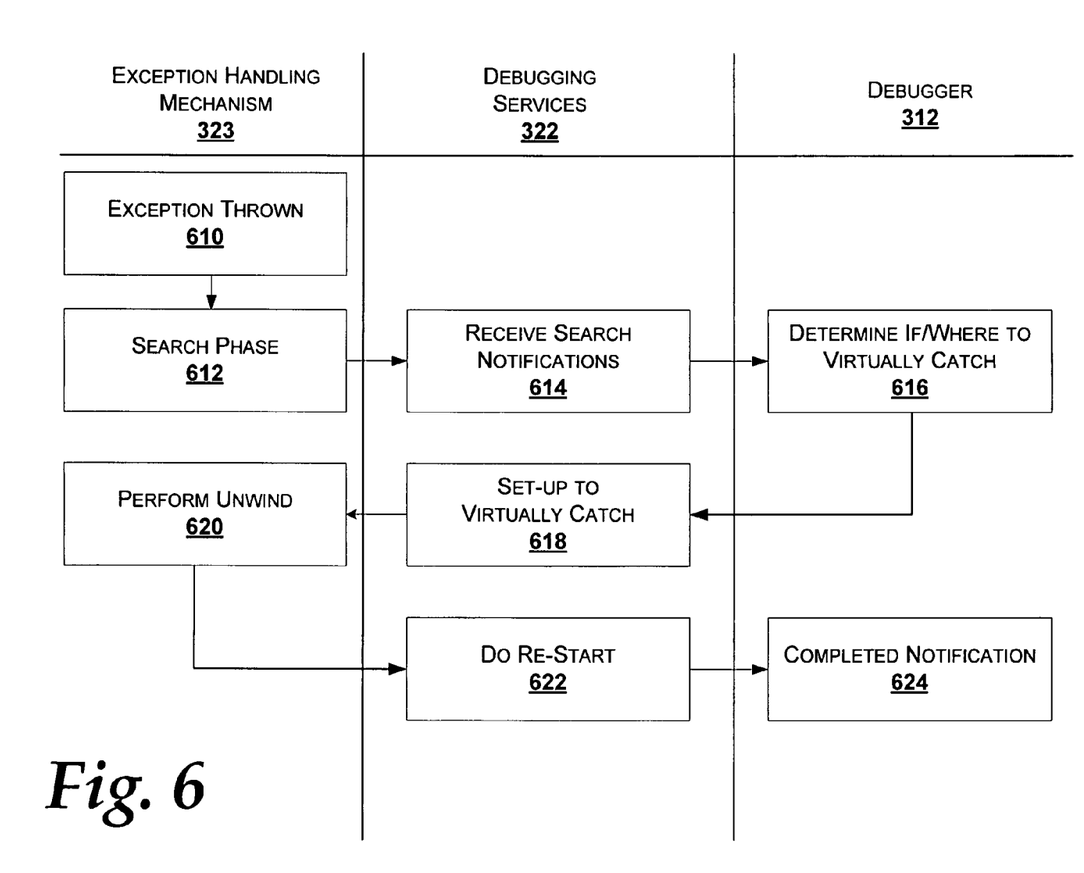
FIG. 6 is a sequence diagram illustrating an exemplary communication exchange between the operating system, the debugger services, and the debugger illustrated in FIG. 3 for implementing the techniques and mechanisms described herein.

In contrast, using the present virtual catching mechanism, described in detail in FIG. 6, a debugger may selectively identify a location from which to re-start the execution of the application. This is achieved by virtually inserting an empty catch block at the specified location and having the exception handling mechanism perform the unwind phase up to the identified location. The process for virtually inserting an empty catch block is now described.

FIG. 6 is a sequence diagram illustrating an exemplary communication exchange between the exception handling mechanism provided by the operating system and/or the runtime environment, the debugging services, and the debugger illustrated in FIG. 3 for implementing the techniques and mechanisms described herein. The process begins at block 610 when an exception is thrown. The exception system 323 will indicate that an exception has been thrown. For example, this may occur via a callback that had been previously registered, a table lookup, and the like.

In block 612, the exception system 323 performs the search phase of exception processing. Thus, the call stack is walked up to determine which handler will handle the exception. The exception system 323 delivers notifications to the debugging services 322 as each function is searched, and a final notification indicating which function will handle the exception or that the exception will not be handled. For each notification, processing continues at block 614.

At block 614, the debugging service 322 receives these notifications and determines whether to forward the notification to the debugger 312. If the debugging service 322 determines to forward the notification onto the debugger 312, processing continues at block 616. Otherwise, the search phase resumes and further notifications may arrive.

At block 616, based on the notification and the other information, the debugger decides whether it would like to virtually insert an empty catch block. This determination may be achieved via a user interface that allows a user to visually select a location, thus indicating the location to virtually insert the empty catch block. If the debugger decides to virtually insert a catch block, processing continues at block 618. However, if the debugger decides not to virtually insert a catch block, the search phase 612 resumes and further notifications 614 may arrive.

At block 618, the debugging services 322 record information about the location at which the catch block is to be virtually inserted. The debugging services 322 pass this information to the exception system 323, and execution continues at block 620.

At block 620, the exception system 323 performs the unwind phase up to the specified location. The debugging service informs the underling exception system to unwind the stack up to the frame specified as the virtual catcher. The exception handling system then performs the unwind phase by calling any handlers that are appropriate and notifying the debugging services when the unwind phase as proceeded to the frame indicated. In one embodiment, this may be achieved by calling an API and specifying the proper establisher frame to which it should be unwound. The unwinding is then performed on the managed frames up to the proper frame itself. Processing continues at block 622.

At block 622, the debugging service 322 sets up the application such that restarting execution of the application continues from the specified location. For example, the debugging service changes the instruction pointer (IP) back to a sequence point prior to the statement that faulted. A sequence point refers to a boundary at which a statement may be broken into a group of executable instructions. Thus, one statement may have multiple sequence points. The compiler adds sequence points in the IL code when it is generated using conventional techniques. The unwind phase in block 620 unwound the stack to the statement or call that faulted. Therefore, the debugging service moves the IP back to the closest sequence point so that the application is in a state that is readily understood by the debugger. The debugger may then choose to further change the program state by setting the IP to the start of another source statement or construct as it desires. The debugging services 322 notifies the debugger 312 that the exception has been handled, and processing continues at block 624.

At block 624, the debugger 312 takes appropriate action in response to the exception being handled. Appropriate action may include notifying the user, refreshing user interface elements and internal data, etc. The debugger then resumes execution of the program. Thus, as described, the debugger has the ability to selectively choose a location at which the execution of the application resumes. This capability provides programmers additional help when debugging their applications.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A computer-implemented method comprising:
receiving a notification having information associated with an exception that occurred during execution of an application;
forwarding the notification to a debugger to obtain a location for virtually inserting an empty catch block, the debugger determining the location for virtually inserting the empty catch block, the act of determining the location for virtually inserting the empty catch block being exclusive of user provided information and inclusive of at least information provided by a debugging service;
virtually inserting an empty catch block at the location; and
informing an exception handling mechanism to perform an unwind phase based on the location.

2. The computer-implemented method of claim 1, wherein the receiving the notification occurs during a search phase for exception processing.

3. The computer-implemented method of claim 1, wherein the exception comprises an unhandled exception and the location corresponds to a main function for the application.

4. The computer-implemented method of claim 1, wherein the information identities a function for handling the exception.

5. The computer-implemented method of claim 4, wherein the location is located on a stack between the function for handling the exception and a statement that caused the exception when executed.

6. The computer-implemented method of claim 5, wherein the statement comprises a function call.

7. The computer-implemented method of claim 1, further comprising re-starting the application.

8. The computer-implemented method of claim 7, wherein the re-starting the application comprises:
setting an instruction pointer to correspond to a statement on a stack associated with the application; and
resuming execution of the application using the instruction pointer.

9. The computer-implemented method of claim 7, wherein the re-starting the application comprises execution using the debugger.

10. The computer-implemented method of claim 1, wherein the unwind phase unwinds the stack up to the location.

11. The computer-implemented method of claim 1, wherein the application comprises one or more managed code modules.

12. The computer-implemented method of claim 11, wherein the application further comprises one or more unmanaged code modules.

13. A computer-readable storage medium having computer-executable instructions for performing the method of claim 1.

14. A computer-implemented method, comprising:
identifying a throwing of an exception during execution of a function within an application;
performing a search phase to identify whether a handler exists for handling the exception;
sending at least one notification that includes information from the search phase;
receiving a location for vitally catching the exception, the location not corresponding to the handler identified during the search phase where the search phase identified the handler for the exception, the location being generated by a debugger and being based on information that is exclusive of user provided information and inclusive of at least information provided by a debugging service;
virtually inserting an empty catch block at the location; and
performing an unwind phase based on the location.

15. The computer-implemented method of claim 14, wherein the unwind phase unwinds a call stack associated with the application to the location.

16. The computer-implemented method of claim 14, wherein the exception comprises an unhandled exception and the location is associated with a main function for the application.

17. The computer-implemented method of claim 14, wherein the search phase identifies the handler and the identified handler is associated with the exception via an exception construct defined within a source module associated with the application.

18. A computer-readable storage medium having computer-executable instructions for performing the method of claim 14.

19. A computer-implemented method comprising:
receiving information associated with an exception that occurred during execution of an application;
identifying a location within the application to virtually insert an empty catch block, the location being identified by a debugger service, the debugger service identifying the location based on information that is exclusive of user provided information and inclusive of at least information provided by a debugging service; and
virtually inserting an empty catch block at the location.

20. The computer-implemented method of claim 19, further comprising resuming execution of the application after a stack is unwound up to the location.

21. The computer-implemented method of claim 19, wherein the location selected by the debugger service is located on a stack between a handler identified during a search phrase for handling the exception and a statement that caused the exception when executed.

22. The computer-implemented method of claim 21, wherein the statement comprises a function call.

23. A computer-readable storage medium having computer-executable instructions to performing the method of claim 19.

24. A system configured to handle exceptions, the system comprising:
a processor; and
a memory into which a plurality of instructions are loaded, the plurality of instructions performing a method comprising:
receiving a notification having information associated with an exception that occurred during execution of an application;
forwarding the notification to a debugger to obtain a location for virtually inserting an empty catch block, the debugger determining the location for virtually inserting the empty catch block, the debugger determining the location based on information that is exclusive of user provided information and inclusive of at least information provided by a debugging service;

virtually inserting an empty catch block at the location; and informing an exception handling mechanism to perform an unwind phase based on the location.

25. The system of claim 24, wherein the receiving the notification occurs during a search phase for exception processing.

26. The system of claim 24, wherein the location is located on a stack between the function for handling the exception and a statement that caused the exception when executed.

27. The system of claim 24, further comprising re-starting the application.

28. The system of claim 27, wherein the re-starting the application comprises:

setting an instruction pointer to correspond to a statement on a stack; and resuming execution of the application using the instruction pointer.

29. The system of claim 27, wherein the re-starting the application comprises execution using the debugger.

* * * * *